Oct. 22, 1929.                L. ENDRESS                1,732,881

NUT LOCK

Filed Aug. 31, 1928

INVENTOR
Lewis Endress
Byrnes, Stebbins & Parmelee
his Attys.

Patented Oct. 22, 1929

1,732,881

UNITED STATES PATENT OFFICE

LEWIS ENDRESS, OF NEW BRIGHTON, PENNSYLVANIA, ASSIGNOR, BY DIRECT AND MESNE ASSIGNMENTS, OF FORTY-TWO AND ONE-HALF PER CENT TO HARRY M. RAWL AND FIFTEEN PER CENT TO KATHERINE MARGARET ECKERT, BOTH OF NEW BRIGHTON, PENNSYLVANIA

NUT LOCK

Application filed August 31, 1928. Serial No. 303,217.

This invention relates to means for preventing a nut from becoming loosened on a bolt. Especially in machinery having vibrating or moving parts which are bolted together there is a tendency for the nut to back up on the bolt and thus loosen its grip upon the parts held together.

Various means have been heretofore suggested for preventing a nut from becoming loosened on a bolt. It has been suggested to utilize a washer between the nut and the adjacent member through which the bolt passes, such washer being provided with outward extensions adapted to be upset against one or more of the flat faces of the nut to prevent it from turning. It has also been proposed to employ a bendable strip non-rotatable with respect to the bolt and extending along the bolt and inside the nut and adapted to be turned down over the top of the nut to contact with one of its flat faces.

Such locking means as those above mentioned have been found unsatisfactory for various reasons. The use of a washer having integral projections adapted to be bent up around the nut is unsatisfactory because the primary purpose of a washer is to resist compressive stresses and in the forming of washers, little or no attention is paid to the ductility or bendability of the material of which the washers are made. When washers are provided with extensions adapted to be bent up, either the entire unit must be made of the usual material of which washers are made and which is particularly adapted for withstanding compressive stresses and not for bending, or they must be made of a material having a desired ductility. It will be seen that the use of either one or the other of these materials renders the washer inefficient to a certain extent.

In the type of nut lock employing a bendable strip extending along the bolt and through the nut, it has been the usual practice to provide a keyway in the bolt for the reception of the strip. The problem has arisen as to how the strip may be prevented from moving outwardly in the keyway and thus losing its cooperative relationship with the nut. This problem has been attempted to be solved by providing a tapered keyway but such a keyway is most unsatisfactory as it is adapted for use with a certain size of strip only, when the members being bolted together have a certain predetermined thickness. It has also been proposed to provide the strip at its extremity nearest the bolt head with a bent-up portion adapted to be received within an annular cavity formed in the bottom of the nut. This has necessitated a complicated structure having little mechanical strength.

I provide a nut lock so constructed as to obviate the disadvantages above noted. I provide a nut lock comprising a bendable member non-rotatably connected with a bolt and a washer for cooperation therewith and having a slot for receiving the bendable member. The bendable member preferably has a portion received within a keyway of constant cross section in the bolt, the portion adapted to be bent up extending outwardly at substantially right angles to the axis of the bolt. When the bolt is passed through the members to be connected together, the bendable member is placed in cooperative relation therewith and the washer having the slot for receiving the bendable member is passed over the bolt and about the outwardly extending portion of the bendable member. The nut is then screwed on and the bendable member upset to contact with a plane face of the nut to prevent it from turning.

In the accompanying drawings, I have shown a present preferred embodiment of the invention, wherein Figure 1 is a cross section through a nut and bolt having my invention applied thereto such as would be taken along the line I—I of Figure 2;

Figure 1:
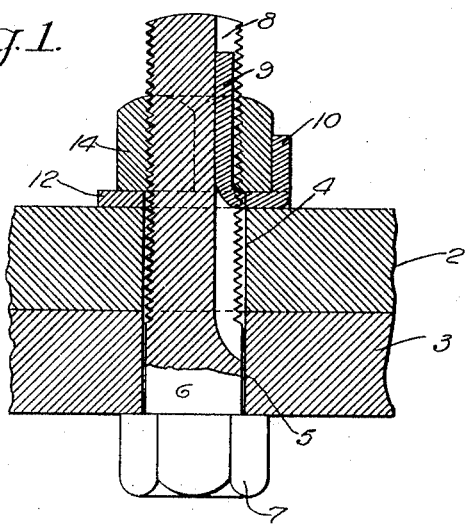
Figure 2:
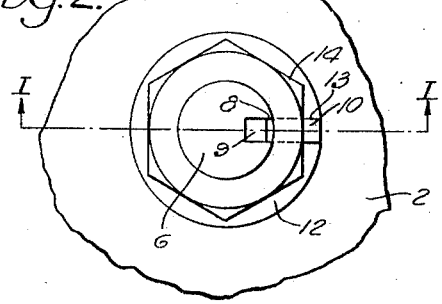
Figure 2 is a view looking down on a bolt having my invention applied thereto.
Figure 3:
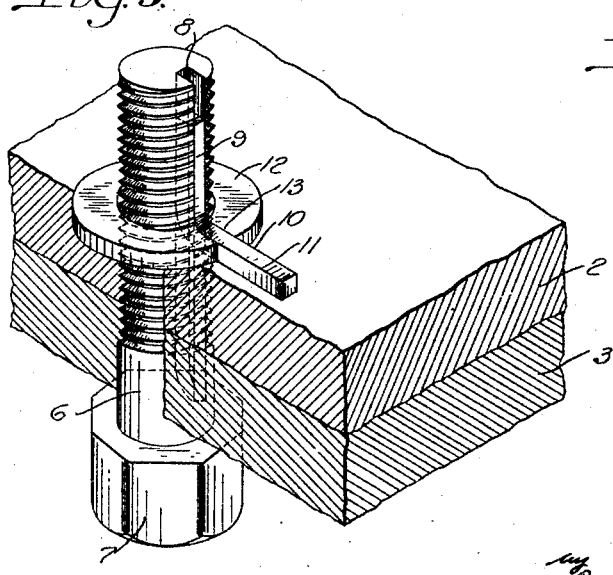
Figure 3 is a perspective view of a bolt having my invention applied thereto but having the nut removed.
Figure 4:
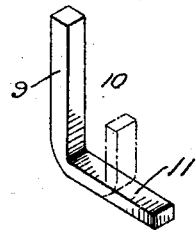
Figure 4 is a perspective view of a bendable locking member.

Referring more particularly to the drawings, reference numerals 2 and 3 designate structural members having the usual bolt holes 4 and 5 respectively through which passes a bolt 6 provided with a head 7 and having a keyway 8 of substantially constant cross section. Cooperating with the bolt and having an upstanding portion 9, adapted to fit within the keyway 8, is a bendable locking member 10 of rectangular cross section. The locking member 10 has an outwardly extending portion 11 also of rectangular cross section adapted to be bent up as will be presently described. Cooperating with the bolt and with the member 10 is a washer 12 provided with a slot 13 for receiving the inner end of the extension 11 of the locking member. The washer and the extension 11 of the locking member are of substantially the same thickness. A nut 14 is screwed down above the locking member and washer and is tightened to the desired degree, whereupon the extension 11 of the locking member 10 is bent up, as shown in full lines in Figure 1 and in dot and dash lines in Figure 4. This upwardly bent portion contacts firmly with the nut at one of the plane faces thereof and thus prevents the nut from turning on the bolt.

I thus provide, in combination, a bolt having a keyway, a nut, a locking member having a portion for entering the keyway and a portion projecting outwardly between the bolt head and the nut, and a washer having a slot for receiving the locking member, the locking member being adapted to be deformed to prevent the nut from turning.

An added advantage in providing the locking member and the washer separately is that if it is desired to remove a bolt the bent up portion of the locking member need merely be chiseled off by a single blow of a hammer and the nut unscrewed. The washer is not damaged and may be used again. Replacement of the locking member is simple and inexpensive.

While I have shown and described a present preferred embodiment of the invention, it is to be understood that the same is not limited to such embodiment but may be otherwise embodied within the scope of the following claim.

I claim:

In combination, a bolt having a keyway, a nut, a locking member of rectangular cross section having a portion for entering and substantially tightly fitting the keyway and having a portion projecting outwardly between the nut and part secured thereby, and a washer whose thickness is substantially the same as the thickness of the locking member and having a slot completely through one side thereof for receiving the locking member, the locking member being adapted to be deformed and to engage a substantial portion of the side of the nut to prevent the nut from turning.

In testimony whereof I have hereunto set my hand.

LEWIS $\overset{\text{his}}{\times}$ ENDRESS.
mark